Oct. 12, 1943.   O. VON ZELEWSKY ET AL   2,331,443
LATHE
Filed July 25, 1940   2 Sheets-Sheet 1

Inventors
Ottomar von Zelewsky and
Karl Künzi
by Sommers + Young
Attorneys

Oct. 12, 1943.   O. VON ZELEWSKY ET AL   2,331,443
LATHE
Filed July 25, 1940   2 Sheets-Sheet 2
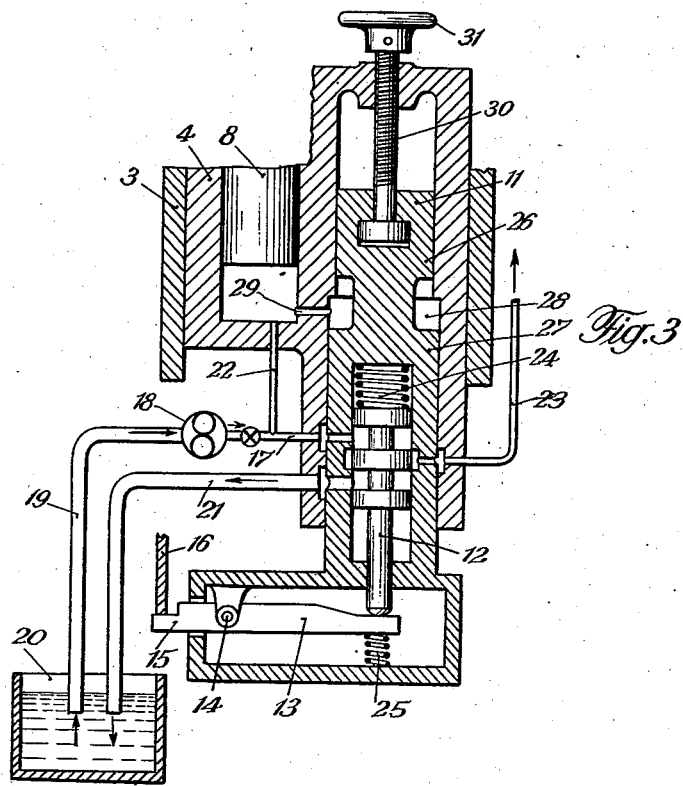
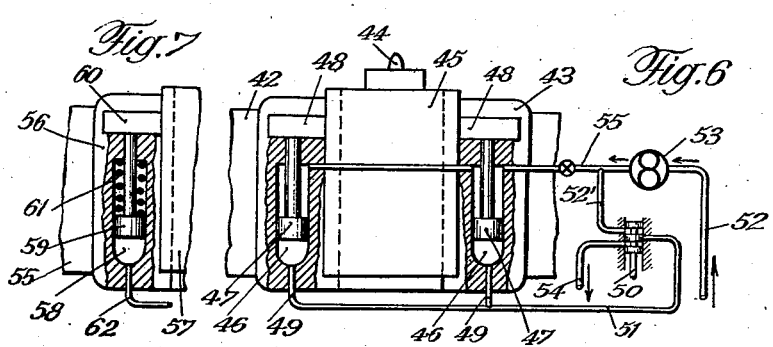
Inventors
Ottomar von Zelewsky and
Karl Künzi
by Sommers + Young
Attorneys Patented Oct. 12, 1943

2,331,443

UNITED STATES PATENT OFFICE 2,331,443

LATHE

Ottomar von Zelewsky, Neuhausen, and Karl Künzi, Schaffhausen, Switzerland, assignors to Aktiengesellschaft der Eisen- und Stahlwerke vormals Georg Fischer, Schaffhausen, Switzerland Application July 25, 1940, Serial No. 347,540
In Germany July 22, 1939

10 Claims. (Cl. 82—14)

This invention relates to lathes comprising a tool slide for holding the turning tool, the tool slide being supported by a horizontal slide for vertical adjustment, whereby the tool is adjusted into cutting position on the work.

According to the present invention, for the adjustment of the tool slide a hydraulic adjusting device is arranged on the horizontal slide, and is provided with a control member which is carried by the tool slide and is controlled by a template stationarily arranged on the machine frame.

In the accompanying drawings several embodiments of the invention are illustrated by way of example only, in which Fig. 1 shows a front elevation of a lathe according to the invention;

Fig. 3 is a vertical section of the control member carried by the tool slide on a larger scale;

Fig. 6 shows an elevation of a second form of the tool slide partly in section, and Fig. 7 is a fragmentary view of a third form of the tool slide.

Figure 1:
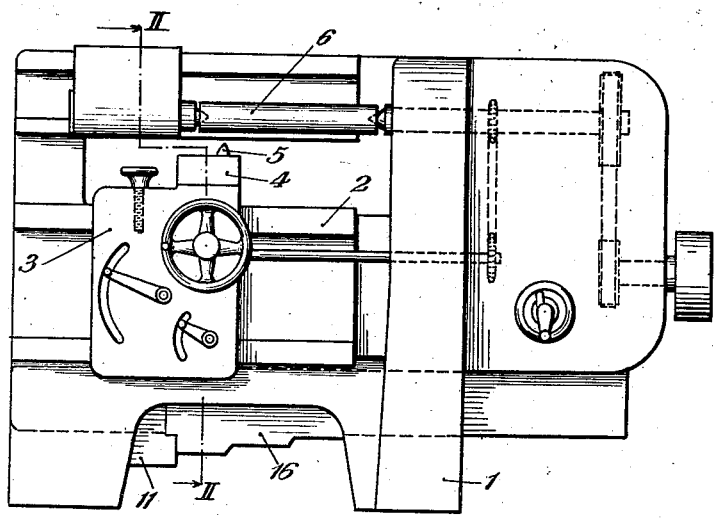
Figure 2:
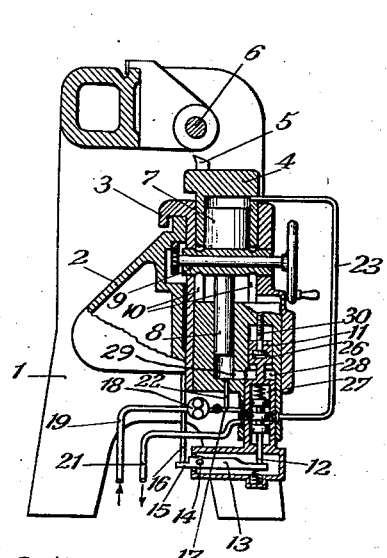
Fig. 2 is a vertical section of the lathe on the line II—II of Fig. 1.

The frame 1 of the lathe is provided with a horizontal bed 2 serving for guiding a horizontal slide 3 (Figs. 1 and 2). On the horizontal slide 3 the tool slide 4 holding the turning tool 5 is guided and is adjustable in the vertical direction. The vertical adjustability of the tool slide 4 serves for applying the turning tool 5 to the work 6. A differential piston having a piston portion 7 of a larger diameter superposed on a piston portion 8 of a smaller diameter is guided in upstanding relation in corresponding cylindrical bores of the tool slide 4. On the differential piston a cross yoke 9 is arranged (Fig. 2) which is supported by the horizontal slide 3. The cross yoke 9 protrudes through slots 10 provided in the tool slide 4.

The tool slide 4 carries a control member 11 having a cylindrical bore guiding a control piston 12 the lower end of which abuts against one of the arms 13 of a two-armed lever pivotally connected to the control member 11, at 14. The other arm 15 of the two-armed lever bears against a cam surface provided on the underside of a template 16 supported by the machine frame 1. A supply conduit 17 leads into the cylinder of the control piston 12 and is connected with a pump 18 the suction conduit 19 of which ends in a supply tank 20 (Fig. 3).

The cylinder bore of the control piston 12 is also connected with a return conduit 21 leading to the supply tank 20. A branch conduit 22 connects the supply conduit 17 with the cylindrical bore provided in the tool slide 4 for the piston portion 8. The cylindrical bore for guiding the control piston 12 is connected with a conduit 23 which leads into the cylindrical bore portion of the tool slide 4 for the piston portion 7 of larger diameter above said piston portion. The upper end face of the control piston 12 is acted upon by a compression spring 24 the other end of which abuts against the upper end wall of the cylinder bore for guiding the piston 12. The two-armed lever is pressed against the lower end of the control piston 12 by a weak compression spring 25 one end of which bears against the arm 13 of the two-armed lever and the other against the control member 11.

The control member 11 is constructed as a differential piston which is guided in corresponding cylindrical bores of the tool slide 4. The upper piston portion 26 of the control member has a smaller diameter than the lower piston portion 27 and the differential piston is provided with an annular groove 28. The hollow space formed by the annular groove 28 communicates with a passage 29 which is arranged in the tool slide 4 so as to interconnect the cylindrical bore of the piston portion 8 of the differential piston 7, 8 with this hollow space. The liquid pressure permanently maintained in the conduit 22 has, therefore, the tendency to force the control member 11 downwardly.

In the upper piston portion 26 of the control member 11 a round head provided on a threaded tension rod 30 is rotatably mounted. The tension rod 30 is threadedly connected with a mating screw bore of the tool slide 4 and is provided with a handwheel 31. By rotationally displacing the handwheel 31 in the corresponding direction the control member 11 can be raised so that the lever arm 15 of the two-armed lever 13, 15 is approached on the template 16. In turning the handwheel 31 in the opposite direction the control member is moved downwardly in conjunction with the liquid pressure acting on a theoretical annular area corresponding to the difference of the cross sectional areas of the piston portions 26, 27.

Figure 4:
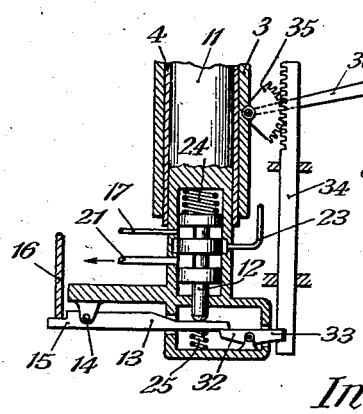
Fig. 4 is a sectional view similar to Fig. 3 with parts for cooperation with the control member added thereto.

In the embodiment shown in Fig. 4 the arm 13 of the two-armed lever 13, 15 is engaged by an arm 32 of a two-armed lever pivotally connected to the control member 11. The other arm 33 of this lever is connected with an upstanding rack 34 cooperating with a toothed segment 35 which is supported by the horizontal slide 3. Alternatively, the toothed sector 35 may be supported by the tool slide 4. The toothed sector is connected to a handle bar 36 which, if accordingly controlled, has the effect to displace the rack and to move the control piston 12 upwards, in such manner, that communication between the conduits 19 and 23 is interrupted and the latter is connected with the return conduit 21, so that the piston portion 7 is relieved from pressure and the tool slide 4 descends, the descending movement being assisted by the action of the hydraulic pressure on the piston portion 8, which pressure is permanently maintained.

Figure 5:
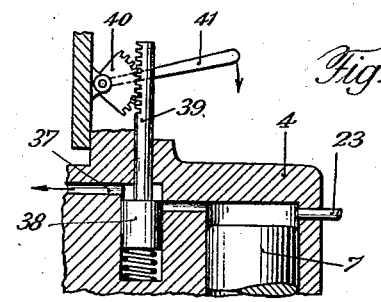
Fig. 5 is a sectional view of a modification of the parts added to Fig. 4.

Instead of the arrangement shown in Fig. 4, an arrangement for the lowering of the tool slide may be used as shown in Fig. 5. The cylindrical bore arranged in the tool slide 4 for guiding the piston portion 7 communicates with a passage 37 which is normally closed by a spring influenced valve piston 38. The guide rod 39 of the piston valve 38 is constructed as a rack which is in mesh with a pivotally mounted toothed sector 40 which can be actuated by means of a handle bar 41, in such manner, that the piston valve is forced downwardly against the spring influence and thus the port of the passage 37 is given free. The passage 37 may be connected with the return conduit 21.

In the embodiment shown in Fig. 6 the numeral 42 designates the bed of the lathe on which a horizontal slide 43 is guided. The horizontal slide 43 serves as a guide for the vertically adjustable tool slide 45 which carries the turning tool 44 and by the adjusting movements of which the turning tool is adjusted into cutting position on the work. In the horizontal slide 43 two vertical cylindrical bores 46 are provided in which two differential pistons 47 are guided the portions of smaller diameter of which are facing toward above. The upper ends of the portions of smaller diameter of the differential pistons 47 are connected to lateral arms 48 projecting from the tool slide 45 on both sides thereof.

The lower portions of the cylinder bores 46 communicate with conduits 49 which are connected with a conduit 51 communicating with the bore of the control member 50. Further connected with the bore of the control member 50 is a supply conduit 52, which includes a pump 53, through a branch pipe 52'. The numeral 54 designates the return conduit connected with the bore of the control member 50. The supply conduit 52 is also connected with a conduit 55 independently of the control member 50, the conduit 55 leading into the upper portions of the cylindrical bores 46.

The liquid pressure which exists in the conduit 55 and in the upper portions of the cylindrical bores 46 and which is permanently maintained acts on the annular areas of the differential pistons 47, in such manner, that by the influence of the liquid pressure these pistons are always tending to lower the tool slide 45. As the control member 50 is so adjusted by the template that pressure liquid is supplied to the conduit 51 and thus to the conduits 49, the differential pistons 47 are moved upwardly together with the tool slide 45 against the action of the liquid pressure on the annular areas of the differential pistons, so that the turning tool 44 is adjusted into cutting position on the work.

In Fig. 7 the bed of the lathe on which a horizontal slide 56 is guided is designated by 55. The horizontal slide 56 serves as a guide for the vertically adjustable tool slide 57 holding the turning tool. In the horizontal slide 56 two vertical cylindrical bores 58 are provided in which are guided differential pistons 59 the portions of smaller diameter of which are facing toward above. The upper ends of the portions of smaller diameter of the differential pistons 59 are connected to lateral arms 60 projecting from the tool slide 57 on both sides thereof. In the cylindrical bores 58 compression springs 61 are arranged the one ends of which abut against the annular areas of the differential pistons 59, whereas the other ends of these springs abut against the upper end walls of the cylindrical bores 58. The springs 61 have the tendency to lower the tool slide 57.

The lower portions of the cylindrical bores 58 communicate with conduits 62 which at their other ends are connected with a pressure conduit communicating with the bore of the control element. By applying pressure fluid to the cylindrical bores 58 through the conduits 62 the differential pistons 59 are raised together with the tool slide 57 against the action of the springs 61.

In the arrangement disclosed the tool slide, that is, the guides thereof are vertically arranged. Instead of vertical guides guide means may be provided which are inclined to the vertical at an acute angle.

We claim:
1. In a machine tool for the turning of a work, having a machine frame carrying a horizontal bed, a horizontal slide slidably arranged on said bed in parallelism with the rotation axis of said work, a differential piston supported by said horizontal slide and having a piston portion of larger diameter than that of a second piston portion on which said first piston portion is superposed, a vertically adjustable tool slide slidably arranged on said horizontal slide for adjusting the turning tool held by said tool slide into cutting engagement with said work and including cylindrical bores mating said first and said second piston portion, a hydraulic adjusting device carried by said horizontal slide, a control member included in said adjusting device and supported by said tool slide, a hydraulic system supplying pressure liquid to said hydraulic adjusting device, said cylindrical bore of said second piston portion being constantly acted upon by said pressure liquid and the supply of said pressure liquid to said cylindrical bore of said first piston portion being controlled by said control member, an accessory device associated with said adjusting device for retracting said tool slide from said work by action of hydraulic pressure derived from said system, and a template for said work stationarily arranged on said machine frame for controlling said control member.

2. In a machine tool for the turning of a work, having a machine frame carrying a horizontal bed, a horizontal slide slidably arranged on said bed in parallelism with the rotation axis of said work, a vertically adjustable tool slide slidably arranged on said horizontal slide for adjusting the turning tool held by said tool slide into cutting engagement with said work, a hydraulic adjusting device carried by said horizontal slide, a control member included in said adjusting device and supported by said tool slide, a hydraulic system supplying pressure liquid to said hydraulic adjusting device, a template for said work stationarily arranged on said machine frame for controlling said control member and having a lower cam face, and a two-armed lever pivotally mounted on said control member and cooperating with said cam face and with the control part of said control member.

3. In a machine tool for the turning of a work, having a machine frame carrying a horizontal bed, a horizontal slide slidably arranged on said bed in parallelism with the rotation axis of said work, a vertically adjustable tool slide slidably arranged on said horizontal slide for adjusting the turning tool held by said tool slide into cutting engagement with said work, control means adjustably carried by said tool slide, a hydraulic adjusting device carried by said horizontal slide, a control member included in said adjusting device and supported by said tool slide, a hydraulic system supplying pressure liquid to said hydraulic adjusting device, and having a lower cam face, and a two-armed lever pivotally mounted on said control member and cooperating with said cam face and with the control part of said control member, said control means being adjustable for retracting said two-armed lever from said template by displacing said control member relative to said tool slide.

4. In a machine tool for the turning of a work, having a machine frame carrying a horizontal bed, a horizontal slide slidably arranged on said bed in parallelism with the rotation axis of said work, a vertically adjustable tool slide slidably arranged on said horizontal slide, an adjusting device carried by said horizontal slide for adjusting the turning tool to the work by action of hydraulic pressure, a control member having a casing constituting a differential piston guided in a cylindrical bore of said tool slide by means of said casing and carrying a control member, the annular area of said differential piston being constantly under said hydraulic pressure, a template for said work stationarily arranged on said machine frame for controlling said control member, and having a lower cam face, and a two-armed lever pivotally mounted on said control member and cooperating with said cam face and with the control part of said control member, said two-armed lever being retractible from said template by influence of said differetial piston and adapted to be approached on said template against the influence of said piston by controlling said control means.

5. In a machine tool for the turning of a work, having a machine frame carrying a horizontal bed, a horizontal slide slidably arranged on said bed in parallelism with the rotation axis of said work, a vertically adjustable tool slide slidably arranged on said horizontal slide for adjusting the turning tool held by said tool slide into cutting engagement with said work, a hydraulic adjusting device carried by said horizontal slide, two pistons and mating cylindrical bores included in said adjusting device, a control member included in said adjusting device and supported by said tool slide, a hydraulic system supplying pressure liquid to said hydraulic adjusting device, and a template for said work stationarily arranged on said machine frame for controlling said control member.

6. In a machine tool for the turning of a work, having a machine frame carrying a horizontal bed, a horizontal slide slidably arranged on said bed in parallelism with the rotation axis of said work, a vertically adjustable tool slide slidably arranged on said horizontal slide for adjusting the turning tool held by said tool slide into cutting engagement with said work, a double hydraulic adjusting device carried by said horizontal slide, each adjusting device portion comprising two pistons and mating cylindrical bores arranged on either side of said tool slide, a control member included in said adjusting device, a hydraulic system supplying pressure liquid to said hydraulic adjusting device, and a template for said work stationarily arranged on said machine frame for controlling said control member.

7. In a machine tool for the turning of a work, having a machine frame carrying a horizontal bed, a horizontal slide slidably arranged on said bed in parallelism with the rotation axis of said work, a vertically adjustable tool slide slidably arranged on said horizontal slide for adjusting the turning tool held by said tool slide into cutting engagement with said work, a double hydraulic adjusting device carried by said horizontal slide, each adjusting device comprising a differential piston and mating cylindrical bores arranged on either side of said tool slide, a control member included in said adjusting device, a hydraulic system supplying pressure liquid to said hydraulic adjusting device, the annular areas of said differential pistons being constantly under said pressure, of said system, and the liquid pressure acting on the area of the larger piston portions of said differential pistons being controlled by said control member, an accessory device associated with said adjusting device for retracting said tool slide from said work by action of hydraulic pressure derived from said system and a template for said work stationarily arranged on said machine frame for controlling said control member.

8. In a machine tool for the turning of a work, having a machine frame carrying a horizontal bed, a horizontal slide slidably arranged on said bed in parallelism with the rotation axis of said work, a vertically adjustable tool slide slidably arranged on said horizontal slide for adjusting the turning tool held by said tool slide into cutting engagement with said work, a double hydraulic adjusting device carried by said horizontal slide, each adjusting device portion comprising two pistons and mating cylindrical bores arranged on either side of said tool slide, spring means interposed between one of said pistons of each of said adjusting device portions and said tool slide, a control member included in said adjusting device, a hydraulic system supplying pressure liquid to said hydraulic adjusting device, and a template for said work stationarily arranged on said machine frame for controlling said control member.

9. In a machine tool for the turning of a work, having a machine frame carrying a horizontal bed, a horizontal slide slidably arranged on said bed in parallelism with the rotation axis of said work, a differential piston supported by said horizontal slide and having a piston portion of larger diameter than that of a second piston portion on which said first piston portion is superposed, a vertically adjustable tool slide slidably arranged on said horizontal slide for adjusting the turning tool held by said tool slide into cutting engagement with said work and including cylindrical bores mating said first and said second piston portion, said first bore being associated with a closable return means, a hydraulic adjusting device carried by said horizontal slide, a control member included in said adjusting device and supported by said tool slide, a hydraulic system supplying pressure liquid to said hydraulic adjusting device, said cylindrical bore of said second piston portion being constantly acted upon by said pressure liquid and the supply of said pressure liquid to said cylindrical bore of said first piston portion being controlled by said return means, a template for said work stationarily arranged on said machine frame for controlling said control member, and having a lower cam face, and a two-armed lever pivotally mounted on said control member and cooperating with said cam face and with the control part of said control member, and being retractable from said template when said return means is opened for discharging said pressure fluid from said first bore.

10. In a machine tool for the turning of a work, having a machine frame carrying a horizontal bed, a horizontal slide slidably arranged on said bed in parallelism with the rotation axis of said work, a vertically adjustable tool slide slidably arranged on said horizontal slide, an adjusting device carried by said horizontal slide for adjusting the turning tool to the work by action of hydraulic pressure, a control member having a casing constituting a differential piston guided in a cylindrical bore of said tool slide by means of said casing and carrying a control means, the annular area of said differential piston being constantly under said hydraulic pressure, a template for said work stationarily arranged on said machine frame for controlling said control member, and having a lower cam face, a two-armed lever pivotally mounted on said control member and cooperating with said cam face and with the control part of said control member, a linkage intercalated between said control means and said two-armed lever for retracting said two-armed lever from said template by influence of said differential piston and lowering said tool slide by controlling said control means.

OTTOMAR VON ZELEWSKY.
KARL KÜNZI.